(12) United States Patent
Babcock et al.

(10) Patent No.: US 10,017,686 B1
(45) Date of Patent: Jul. 10, 2018

(54) PROPPANT DRYING SYSTEM AND METHOD

(71) Applicants: Linde Aktiengesellschaft, Munich (DE); John A. Babcock, Houston, TX (US)

(72) Inventors: John A. Babcock, Houston, TX (US); Charles P. Siess, III, Conroe, TX (US)

(73) Assignee: LINDE AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/442,977

(22) Filed: Feb. 27, 2017

(51) Int. Cl.
| | |
|---|---|
| *E21B 43/40* | (2006.01) |
| *E21B 43/34* | (2006.01) |
| *C09K 8/80* | (2006.01) |
| *E21B 43/267* | (2006.01) |
| *E21B 43/26* | (2006.01) |
| *C09K 8/62* | (2006.01) |
| *C09K 8/70* | (2006.01) |
| *C04B 35/14* | (2006.01) |
| *C04B 41/80* | (2006.01) |

(52) U.S. Cl.
CPC .......... *C09K 8/80* (2013.01); *C04B 35/14* (2013.01); *C04B 41/80* (2013.01); *C09K 8/62* (2013.01); *C09K 8/703* (2013.01); *E21B 43/26* (2013.01); *E21B 43/267* (2013.01); *C04B 2235/3418* (2013.01)

(58) Field of Classification Search
CPC .......... E21B 43/34; E21B 43/40; E21B 41/00
See application file for complete search history.

(56) References Cited

U.S. PATENT DOCUMENTS

| | | | |
|---|---|---|---|
| 3,035,637 | A | 5/1962 | Allen |
| 3,316,965 | A | 5/1967 | Watanabe |
| 3,319,712 | A | 5/1967 | O'Brien |
| 3,368,627 | A | 2/1968 | Hurst et al. |
| 4,490,985 | A | 1/1985 | Wells |
| 4,511,381 | A | 4/1985 | Mehra |
| 6,230,814 | B1 | 5/2001 | Nasr et al. |
| 7,373,790 | B2 | 5/2008 | Clare et al. |
| 8,505,332 | B1 | 8/2013 | Prim |

(Continued)

FOREIGN PATENT DOCUMENTS

| | | |
|---|---|---|
| CN | 201885591 U | 6/2011 |
| DE | 102014010105 A1 | 1/2016 |

(Continued)

OTHER PUBLICATIONS

M. Asadi et al., "Water-Free Fracturing: A Case History", Society of Petroleum Engineers, SPE-175988-MS, 14 Pages, 2015.

(Continued)

*Primary Examiner* — Catherine Loikith
(74) *Attorney, Agent, or Firm* — Patterson + Sheridan, L.L.P.

(57) ABSTRACT

A method of dehydrating proppant is achieved by pressurizing a proppant silo that is filled with proppant and injecting gaseous nitrogen into the proppant silo. The gaseous nitrogen is used to exhaust moisture from the proppant silo until the proppant is in a bone-dry condition. The moisture is exhausted from the proppant silo while maintaining a back pressure within the proppant silo. The bone-dry proppant can be mixed with a stimulation fluid and injected into a hydrocarbon bearing reservoir.

20 Claims, 3 Drawing Sheets

(56) References Cited

U.S. PATENT DOCUMENTS

| | | |
|---|---|---|
| 8,844,639 B2 | 9/2014 | Gupta et al. |
| 9,488,040 B2 | 11/2016 | Chakrabarty et al. |
| 9,534,836 B2 | 1/2017 | Dubettier-Grenier et al. |
| 2005/0189112 A1 | 9/2005 | Taylor et al. |
| 2006/0243437 A1 | 11/2006 | Albers et al. |
| 2006/0289166 A1 | 12/2006 | Stromquist et al. |
| 2007/0000666 A1 | 1/2007 | Vozniak et al. |
| 2007/0187340 A1 | 8/2007 | Oresti et al. |
| 2008/0087041 A1 | 4/2008 | Denton et al. |
| 2012/0000660 A1 | 1/2012 | Gatlin et al. |
| 2012/0047942 A1 | 3/2012 | Kolodziej |
| 2013/0168086 A1 | 7/2013 | Roberts |
| 2013/0220605 A1 | 8/2013 | Vandor |
| 2013/0299167 A1 | 11/2013 | Fordyce et al. |
| 2014/0000899 A1 | 1/2014 | Nevison |
| 2014/0124208 A1 | 5/2014 | Loree et al. |
| 2014/0174747 A1* | 6/2014 | Kelly ............... E21B 43/267 166/308.2 |
| 2014/0366577 A1 | 12/2014 | Zubrin et al. |
| 2015/0021022 A1 | 1/2015 | Ladva et al. |
| 2015/0152318 A1 | 6/2015 | Travis |
| 2015/0167550 A1 | 6/2015 | Vandervort et al. |
| 2015/0184932 A1 | 7/2015 | Higginbotham et al. |
| 2015/0233222 A1 | 8/2015 | Teklu et al. |
| 2015/0368566 A1 | 12/2015 | Young et al. |
| 2016/0280607 A1 | 9/2016 | Land et al. |
| 2017/0275520 A1* | 9/2017 | Babcock ............... C09K 8/703 |

FOREIGN PATENT DOCUMENTS

| | | |
|---|---|---|
| FR | 2466606 A1 | 4/1981 |
| GB | 2219818 A | 12/1989 |
| WO | 2010025540 A1 | 3/2010 |
| WO | 2012097424 A1 | 7/2012 |
| WO | 2015020654 A1 | 2/2015 |
| WO | 2015/030908 A2 | 3/2015 |
| WO | 2016064645 A1 | 4/2016 |

OTHER PUBLICATIONS

Ginley, "Osudo Reservoir Fluid Study Jordan B No. 1 Well", http://ocdimage.emnrd.state.nm.us/imaging/filestore/SantaFeAdmin/CF/ADA-03-00539 Case Files Part 6/10796_4159.pdf, pp. 1,5; table 2, Jan. 1, 1992.

Holtz et al., "Summary Integrated Geologic and Engineering Determination of Oil-Reserve—Growth Potential in Carbonate Reservoirs", https://www.onepetro.org/download/journal-paper/SPE-22900-PA?id=journal-paper/SPE-22900-PA, p. 1250 and 1253, Jan. 1, 1992.

Nakashima et al., "SPE-177801-MS Development of a Giant Carbonate Oil Field, Part 2: Mitigation from Pressure Maintenance Developement to Sweep Oriented IOR Development", https://www.onepetro.org/download/conference-paper/SPE-177801-MS?id=conference-paper/SPE-177801-MS, pp. 1-8 and 12-16, Jan. 1, 2015.

Pazuki et al., "A modified Flory-Huggins model for prediction of asphaltenes precipitation in crude oil", Fuel, IPC Science and Technology Press, Guildford, GB, vol. 85, No. 7-8, pp. 1083-1086, May 1, 2016.

Qing Sun et al., "Quantification of uncertainty in recovery efficiency predictions: lessons learned from 250 mature carbonate fields", SPE 84459, pp. 1-15, Jan. 1, 2005.

Rassenfoss; "In Search of the waterless fracture", JPT, Jun. 30, 2013, pp. 46-54, XP055237780.

International Search Report and Written Opinion dated Nov. 7, 2017, corresponding to Application No. PCT/US2017/019619.

* cited by examiner

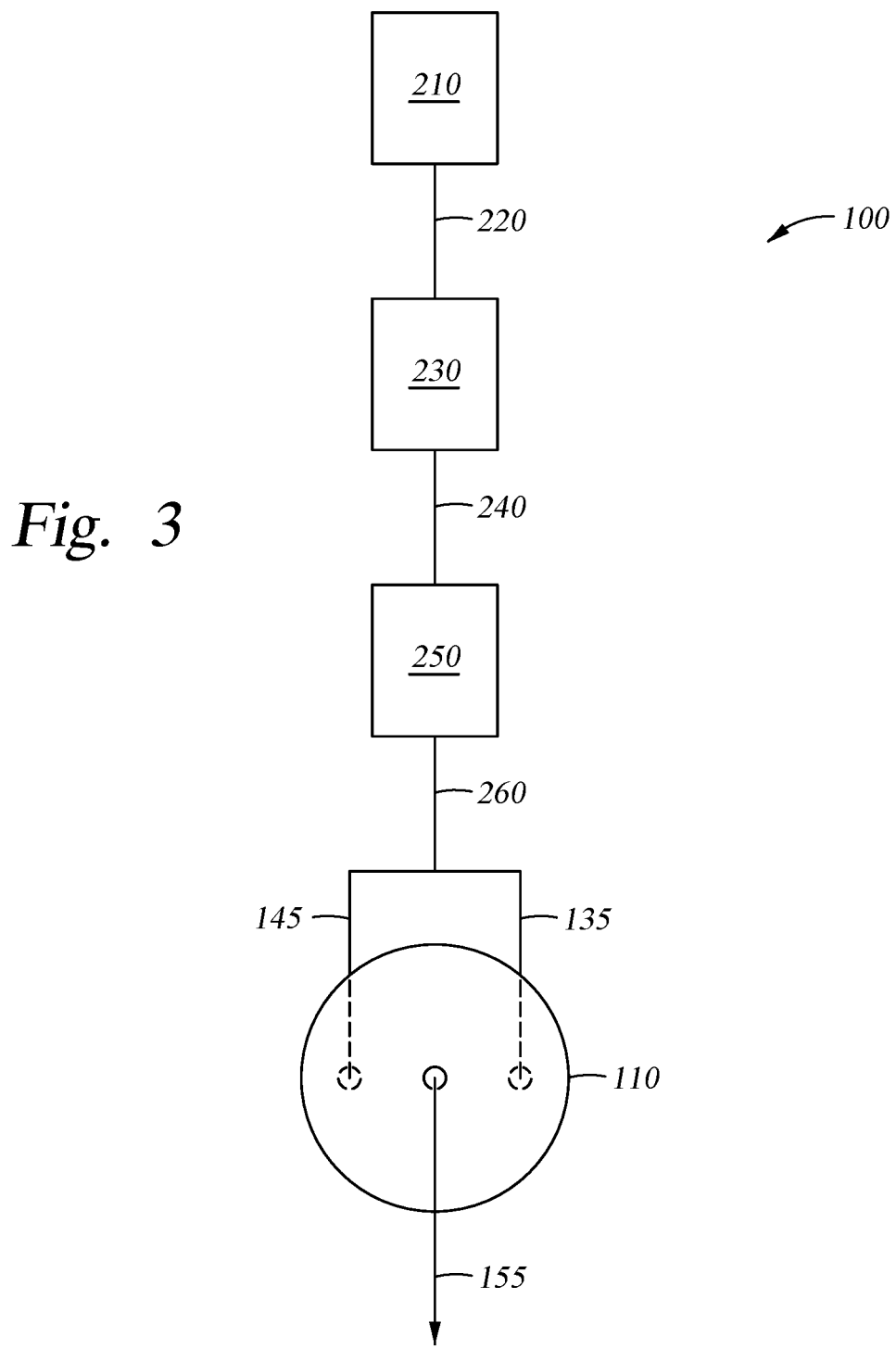

PROPPANT DRYING SYSTEM AND METHOD

BACKGROUND

Field

Embodiments of the disclosure relate to methods and systems of a proppant drying system to provide bone-dry proppant for use with a low temperature waterless hydraulic fracturing fluid to hydraulically and thermally fracture a hydrocarbon bearing reservoir.

Description of the Related Art

Fracture treatments are utilized to improve fluid conductivity between a wellbore and a subsurface formation of interest to increase fluid production rate and associated reserves. Hydraulic fracture treatments are typically used in low-permeability formations, in conventional reservoirs to bypass near-wellbore permeability damage, and in unconventional reservoirs to intersect induced fractures with a natural fracture network. Proppant is often injected into the subsurface formation with the hydraulic fracturing fluid to keep the fractures open to maintain conductivity and increase productivity.

As hydrocarbon recovery costs continue to increase, there is a continuous need for new and improved methods and systems to increase hydrocarbon productivity.

SUMMARY

The embodiments of this disclosure are directed to methods and systems for providing bone-dry proppant that can be injected into a subsurface formation with a low temperature waterless hydraulic fracturing fluid that is chilled to a low temperature to thermally stress and cause secondary fracturing to the subsurface formation.

In one embodiment, a method of dehydrating proppant comprises pressurizing a proppant silo that is filled with proppant; injecting gaseous nitrogen into the proppant silo; and exhausting the gaseous nitrogen and moisture from the proppant silo to dehydrate the proppant to a bone-dry condition, while maintaining a back pressure within the proppant silo.

BRIEF DESCRIPTION OF THE DRAWINGS

FIG. 3 is a schematic illustration of a proppant drying system according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the methods and systems described herein utilize a stimulation fluid for treating (such as fracturing and/or cooling) a subsurface formation (such as a hydrocarbon bearing reservoir). The stimulation fluid may be a low temperature (such as below zero degrees Fahrenheit) waterless hydraulic fracturing fluid. The stimulation fluid may comprise naturally occurring, locally available components that are non-damaging to the subsurface formation, cost effective, and can be chilled to low temperatures.

The low temperature of the stimulation fluid applies a thermal stress to the subsurface formation to produce microscopic fractures that enhance permeability of the subsurface formation. Reducing the temperature using the stimulation fluid results in differential contraction of restrained rock within the subsurface formation, thereby creating fracturing and cracks. When combined with hydraulic fracturing, using the same or another stimulation fluid, thermally fracturing the subsurface formation creates secondary fracturing along the primary induced fractures to further increase the effective conductivity of the subsurface formation. Reservoir simulation software indicates an improvement in wellbore productivity of 20% using a combination of hydraulic fracturing and thermal fracturing.

In one embodiment, a foamed unfractionated hydrocarbon mixture can be used as a cryogenic stimulation fluid to transmit pressure and both suspend and transport proppant to a subsurface formation at a temperature below 0 degrees Fahrenheit, such as at a temperature near –20 degrees Fahrenheit.

The use of a low temperature stimulation fluid requires the use of a bone-dry proppant (e.g. extremely or completely dry proppant containing no moisture) to prevent individual proppant particles from freezing together, which may form a blockage when trying to inject the proppant into a subsurface formation. In one example, the proppant when in the bone-dry condition may have less than 0.01% moisture.

Figure 1:
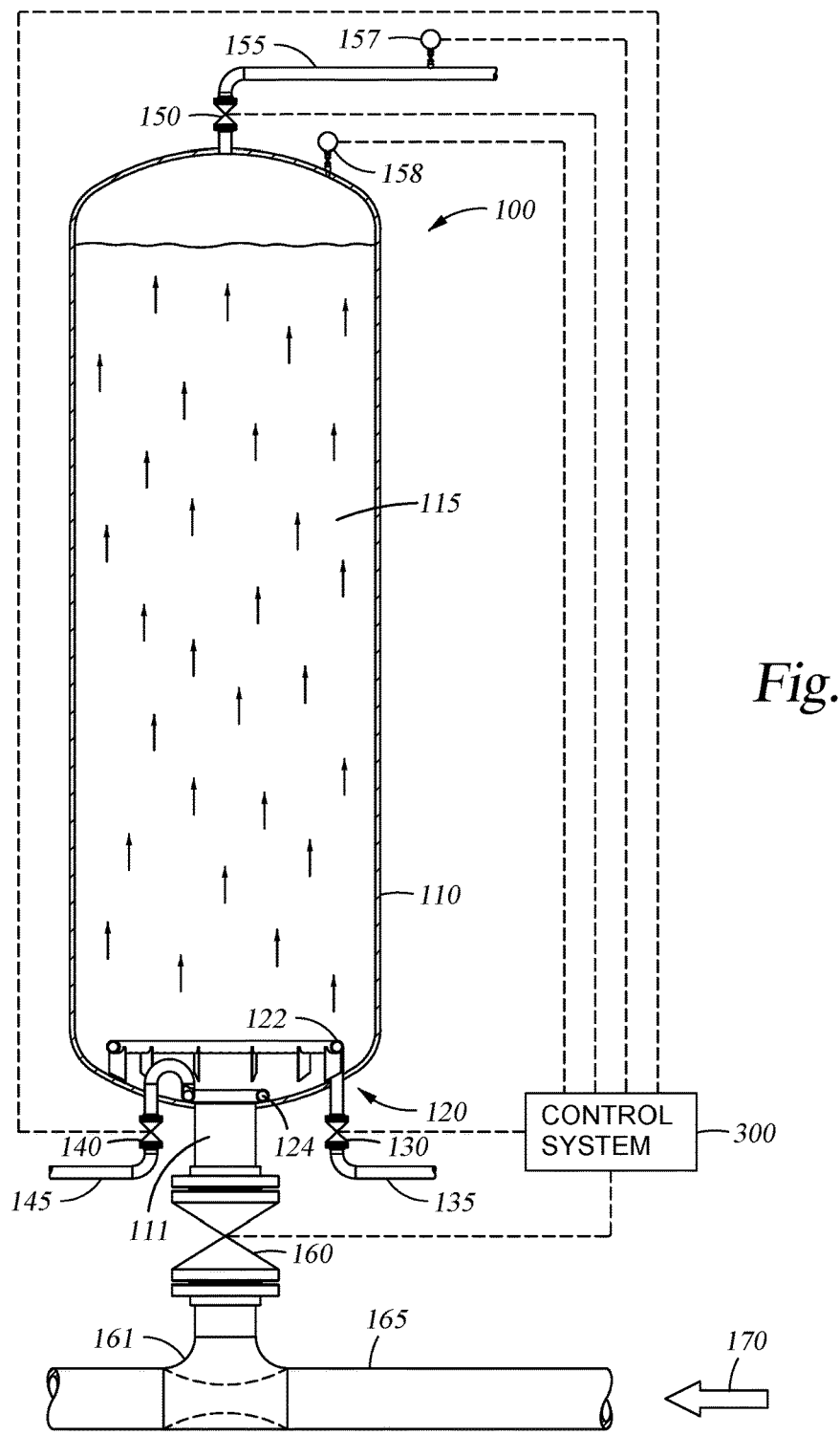
FIG. 1 is a sectional view of a proppant drying system according to one embodiment.
Figure 2:
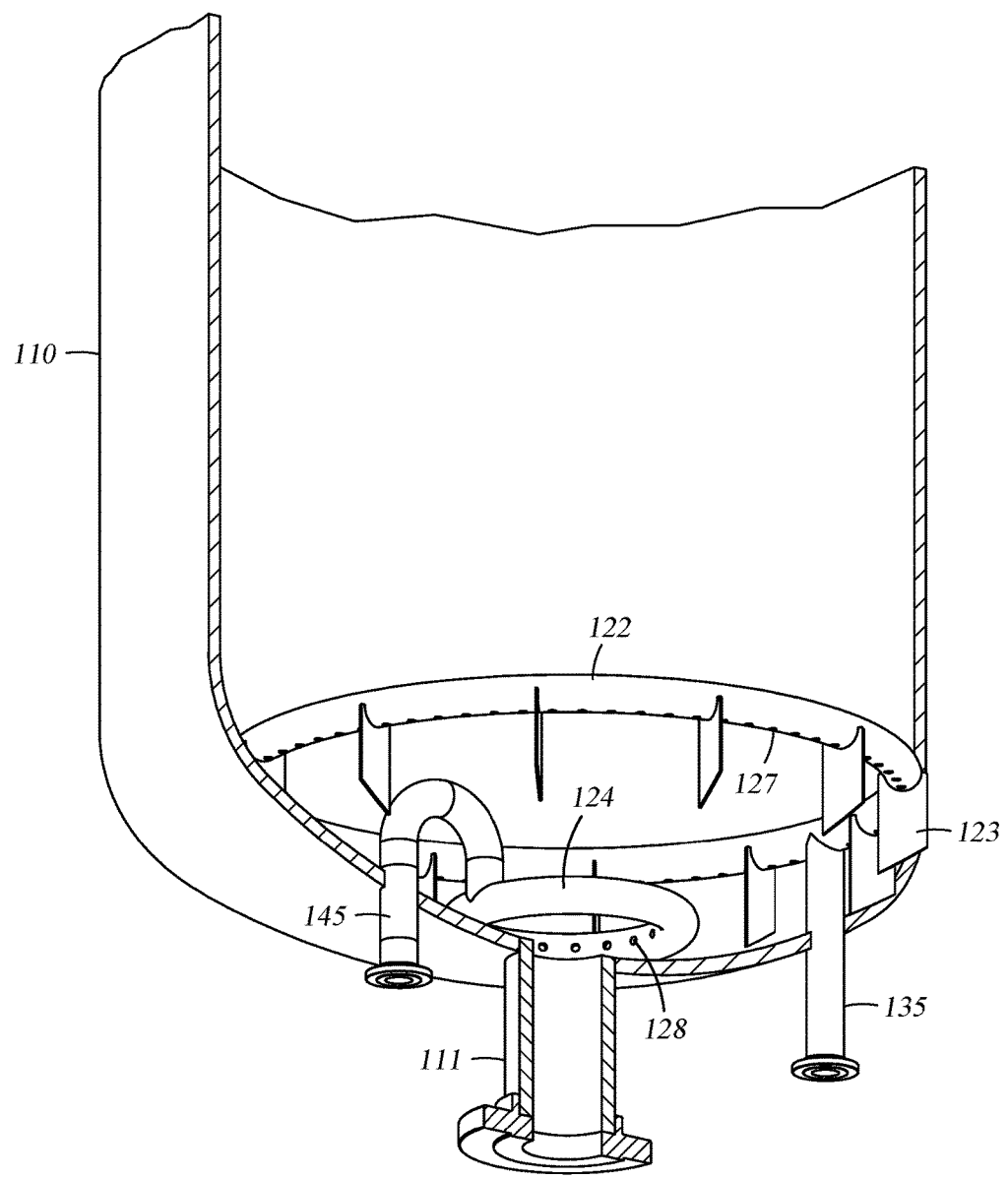
FIG. 2 is an isometric sectional view of a portion of the proppant drying system of FIG. 1 according one embodiment.

FIG. 1 is a sectional view of a proppant drying system 100 configured to dehydrate proppant according to one embodiment. FIG. 2 is an isometric sectional view of a lower portion of the proppant drying system 100. The system 100 includes a proppant silo 110 and an injection system 120 disposed within the proppant silo 110. The proppant silo 110 is a cylindrical vessel having a flanged outlet 111 from which proppant 115 may be removed. The injection system 120 is configured to inject gaseous nitrogen into the proppant silo 110 as further described below. The system 100 further includes a control system 300 configured to monitor and/or control operation of one or more components of the system 100 as further described below.

The injection system 120 includes a first perforated ring 122 and a second perforated ring 124 coupled to the inner walls of the proppant silo 110. The first perforated ring 122 is positioned above and has a large diameter than the second perforated ring 124, which is located in a narrower neck region at the bottom of the proppant silo 110 above the outlet 111. The first perforated ring 122 is coupled to the proppant silo 110 by brackets 123, while the second perforated ring 124 is seated at the base of the proppant silo 110.

The first and second perforated rings 122, 124 each include a plurality of perforations 127, 128 disposed about the periphery of the first and second perforated rings 122, 124. The perforations 127 of the first perforated ring 122 are disposed through and about the bottom of the first perforated ring 122. The perforations 128 of the second perforated ring 124 are disposed through and about the inner side of the second perforated ring 124. In other embodiments, the perforations may be disposed through and about the top, bottom, inner side, and/or outer side of the first and/or second perforated rings 122, 124.

The first and/or second perforated rings 122, 124 may be coated with an erosion resistant coating, such as a tungsten coating, a diamond coating, or a ceramic coating, to prevent erosion of the first and/or second perforated rings 122, 124 by the proppant 115 in the proppant silo 110.

A first inlet control valve 130 controls the flow of gaseous nitrogen into the first perforated ring 122 via line 135. A second inlet control valve 140 controls the flow of gaseous nitrogen into the second perforated ring 124 via line 145. An exhaust control valve 150 controls the flow of gaseous nitrogen, as well as any moisture (e.g. water vapor and/or liquid water) that is absorbed by and/or entrained with the flow of gaseous nitrogen, out of the proppant silo 110 via line 155.

The proppant silo 110 is filled with proppant 115, such as graded sand or man-made ceramics. Gaseous nitrogen is pumped into the injection system 120 via control valves 130, 140 and lines 135, 145, respectively, and then injected by the injection system 120 into the proppant silo 110. The gaseous nitrogen flows into the perforated rings 122, 124 via lines 135, 145 and out of the perforations of the first and second perforated rings 122, 124 into the interior of the proppant silo 110.

The perforations are located at the bottom of the first perforated ring 122 and at the inner side of the second perforated ring 124 so that the gaseous nitrogen is initially injected in a direction toward the bottom of the proppant silo 110 by the first perforated ring 122, and in a direction inward toward the center of the proppant silo 110 by the second perforated ring 124. As stated above, the perforations can be disposed through the top, bottom, inner side, and/or outer side of the first and/or second perforated rings 122, 124. The gaseous nitrogen disperses and flows upward toward the top of the proppant silo 110 while absorbing any moisture (e.g. water vapor and/or liquid water that has condensed on the surfaces of the proppant 115 and/or the walls of the proppant silo 110) within the proppant silo 110.

The gaseous nitrogen and moisture that is absorbed by and/or entrained with the flow of gaseous nitrogen are exhausted out of the proppant silo 110 through the exhaust control valve 150 via line 155 to dehydrate the proppant 115 to a bone-dry condition. The exhaust control valve 150 is configured to maintain a back pressure within the proppant silo 110 to keep the proppant silo 110 pressurized. A sensor 157, such as a moisture and temperature detection sensor, is in communication with the line 155 is configured to monitor, measure, digitally record, and/or provide a signal corresponding to the moisture content and/or the temperature of the exhaust in the line 155 to the control system 300 to indicate when all of the moisture has been removed from the proppant silo 110. In one embodiment, the sensor 157 is a digital inline sensor.

The exhaust from the proppant silo 110, including the gaseous nitrogen and absorbed and/or entrained moisture, may be monitored and/or measured by the sensor 157 to determine the water content and/or temperature of the exhaust as a way of indicating when the proppant 115 is dehydrated to a bone-dry condition. When in the bone-dry condition, the proppant 115 within the proppant silo 110 is extremely or completely dry and contains no moisture. In the bone-dry condition, the proppant 115 can be injected into a subsurface formation with a low temperature hydraulic fracturing fluid without the proppant 115 freezing together.

A control valve 160 is coupled to the outlet 111 at the bottom of the proppant silo 110 and configured to open and close to control the flow of the proppant 115 out of the proppant silo 110 and into a flow line 165 (e.g. at a preset rate or to a fixed pumping schedule) containing a stimulation fluid stream 170, such as a low temperature waterless hydraulic fracturing fluid. The flow line 165 may include an eductor 161 located below the control valve 160 that is configured to generate a vacuum that induces the proppant into the stimulation fluid stream 170. The eductor 161 may be made out of an abrasion resistant material, such as hardened steel or ceramic. The bone-dry proppant 115 is mixed with the stimulation fluid stream 170 and may be sent through one or more systems to prepare it for injection into a hydrocarbon bearing reservoir to hydraulically fracture and thermally fracture the hydrocarbon bearing reservoir. For example, the one or more systems may include a blender, a high pressure pump, and a foaming device configured to generate high quality nitrogen foam with the stimulation fluid stream 170 and the proppant 115.

The control system 300 is in communication with and configured to control (e.g. open and close) the control valves 130, 140, 150, 160. The control system 300 is also in communication and configured received a signal from the sensor 157 corresponding to the water content and temperature of the exhaust in the line 155. The control system 300 is also in communication and configured received a signal from a pressure gauge 158 corresponding to the pressure within the proppant silo 110. Based on the water content and temperature of the exhaust as measured by the sensor 157, when the proppant 115 is in a bone-dry condition, the control system 300 is configured to close the control valves 130, 140 to stop the injection of gaseous nitrogen into the proppant silo 110, close the control valve 150 to stop the flow of exhaust out of the proppant silo 110, and open the control valve 160 to allow the proppant 115 to flow into the stimulation fluid stream 170. Based on the pressure in the proppant silo 110 as measure by the pressure gauge 158, if the pressure falls below a predetermined level, then the control system 300 is configured to open the control valves 130, 140 to continue to pump gaseous nitrogen into the proppant silo 110 to maintain a positive pressure within the proppant silo 110 as the proppant 115 is flowing out into the stimulation fluid stream 170 to prevent backflow into the proppant silo 110.

The proppant silo 110 may be formed out of metal, such as stainless steel. The proppant silo 110 may be rated up to 450 psi working pressure. The first and/or second perforated rings 122, 124 may be attached to the inner wall of the proppant silo 110 by welding and/or by one or more support members, such as brackets 123. The perforations of the first and/or second perforated rings 122, 124 may be about 0.1 inches in diameter or less to prevent plugging by the proppant in the proppant silo 110.

The weight of the proppant within the proppant silo 110 is sufficient to prevent the proppant from being pumped out of the proppant silo 110 through the exhaust line 155. The gaseous nitrogen pumped through the proppant silo 110 may have a purity of 99.9% or better.

FIG. 3 is a schematic illustration of the proppant drying system 100. The system 100 includes a storage tank 210 containing liquid nitrogen that flows to a cryogenic pump 230 via line 220 and into a vaporizing unit 250 via line 240 where the liquid nitrogen is vaporized and heated into gaseous nitrogen. The gaseous nitrogen is discharged from the vaporizing unit 250 via line 260 and flows into the proppant silo 110 via lines 135, 145 in accordance with FIGS. 1 and 2. The gaseous nitrogen and any absorbed and/or entrained moisture are exhausted from the proppant silo 110 via line 155 through control valve 150, which maintains a back pressure within the proppant silo 110.

The cryogenic components of the system 200, such as the storage tank 210, the cryogenic pump 230, lines 220, 240, and the vaporizing unit 250 may be made of material resistant to low temperatures. Such materials include, but are not limited to, carbon steel, stainless steel, nickel, Inconel, and austenitic stainless steel. The vaporizing unit 250 may be a direct fired unit, an indirect heated unit, an exhaust heat recovery unit, or an ambient unit.

In one embodiment, a method of dehydrating proppant comprises pressurizing a proppant silo that is filled with proppant, injecting gaseous nitrogen into the proppant silo, and exhausting the gaseous nitrogen and moisture from the proppant silo to dehydrate the proppant to a bone-dry condition, while maintaining a back pressure within the proppant silo.

The proppant may be graded sand or man-made ceramics. The proppant silo may be rated up to 450 psi working pressure. The gaseous nitrogen may have a purity of 99.9% or better.

The method may further comprise gasifying liquid nitrogen contained in a liquid nitrogen storage tank by pumping the liquid nitrogen through a vaporizing unit for injection into the proppant silo. The vaporizing unit may be a direct fired unit, an indirect heated unit, an exhaust heat recovery unit, or an ambient unit.

The method may further comprise pumping gaseous nitrogen into an injection system disposed within the proppant silo to inject the gaseous nitrogen into the proppant silo. The injection system may comprise a first perforated ring and a second perforated ring each coupled to the proppant silo. Perforations formed in the first and second perforated rings may be 0.1 inches or less in diameter. The first and second perforated rings may be coated with an erosion resistant coating. The erosion resistant coating may comprise a tungsten coating, a diamond coating, or a ceramic coating.

The method may further comprise mixing the proppant when in the bone-dry condition with a stimulation fluid. The stimulation fluid may be a low temperature waterless hydraulic fracturing fluid. The method may further comprise generating a high quality nitrogen foam with the stimulation fluid and the proppant. The method may further comprise injecting the high quality nitrogen foam with the stimulation fluid and the proppant into a hydrocarbon bearing reservoir to fracture the hydrocarbon bearing reservoir.

The method may further comprise monitoring the water content and temperature of the gaseous nitrogen and moisture exhausted from the proppant silo to indicate when the proppant is in the bone-dry condition. The method may further comprise controlling flow of the proppant when in the bone-dry condition out of the proppant silo and into a stimulation fluid stream. The method may further comprise injection gaseous nitrogen into the proppant silo while the proppant flows out of the proppant silo to maintain a positive pressure within the proppant silo. The method may further comprise closing a control valve via a control system to stop injection of gaseous nitrogen into the proppant silo, and closing another control valve via the control system to stop flow of exhaust out of the proppant silo. The method may further comprise opening another control valve via the control system to allow the proppant to flow out of the proppant silo when in the bone-dry condition.

While the foregoing is directed to certain embodiments, other and further embodiments may be devised without departing from the basic scope of this disclosure.

We claim:

1. A method of dehydrating proppant, comprising:
   pressurizing a proppant silo that is filled with proppant;
   pumping gaseous nitrogen into an injection system disposed within the proppant silo to inject the gaseous nitrogen into the proppant silo, wherein the injection system comprises a first perforated ring and a second perforated ring each coupled to the proppant silo;
   injecting the gaseous nitrogen into the proppant silo via the injection system; and
   exhausting the gaseous nitrogen and moisture from the proppant silo to dehydrate the proppant to a bone-dry condition, while maintaining a back pressure within the proppant silo.

2. The method of claim 1, wherein the proppant is graded sand or man-made ceramics.

3. The method of claim 1, wherein the proppant silo is rated up to 450 psi working pressure.

4. The method of claim 1, wherein the gaseous nitrogen has a purity of 99.9% or better.

5. The method of claim 1, further comprising gasifying liquid nitrogen contained in a liquid nitrogen storage tank by pumping the liquid nitrogen through a vaporizing unit for injection into the proppant silo.

6. The method of claim 5, wherein the vaporizing unit is a direct fired unit, an indirect heated unit, an exhaust heat recovery unit, or an ambient unit.

7. The method of claim 1, wherein perforations formed in the first and second perforated rings are 0.1 inches or less in diameter.

8. The method of claim 1, wherein the first and second perforated rings are coated with an erosion resistant coating.

9. The method of claim 8, wherein the erosion resistant coating comprises a tungsten coating, a diamond coating, or a ceramic coating.

10. The method of claim 1, further comprising mixing the proppant when in the bone-dry condition with a stimulation fluid.

11. The method of claim 10, wherein the stimulation fluid is a low temperature waterless hydraulic fracturing fluid.

12. The method of claim 11, further comprising generating a high quality nitrogen foam with the stimulation fluid and the proppant.

13. The method of claim 12, further comprising injecting the high quality nitrogen foam with the stimulation fluid and the proppant into a hydrocarbon bearing reservoir to fracture the hydrocarbon bearing reservoir.

14. The method of claim 1, further comprising monitoring a water content and temperature of the gaseous nitrogen and moisture exhausted from the proppant silo to indicate when the proppant is in the bone-dry condition.

15. The method of claim 1, further comprising controlling flow of the proppant when in the bone-dry condition out of the proppant silo and into a stimulation fluid stream.

16. The method of claim 15, further comprising injecting gaseous nitrogen into the proppant silo while the proppant flows out of the proppant silo to maintain a positive pressure within the proppant silo.

17. The method of claim 1, further comprising closing a first control valve via a control system to stop injection of gaseous nitrogen into the proppant silo, and closing a second control valve via the control system to stop flow of exhaust out of the proppant silo.

18. The method of claim 17, further comprising opening a third control valve via the control system to allow the proppant to flow out of the proppant silo when in the bone-dry condition.

19. A method of dehydrating proppant, comprising:
    pressurizing a proppant silo that is filled with proppant;
    injecting gaseous nitrogen into the proppant silo;

exhausting the gaseous nitrogen and moisture from the proppant silo to dehydrate the proppant to a bone-dry condition, while maintaining a back pressure within the proppant silo;

mixing the proppant when in the bone-dry condition with a foamed unfractionated hydrocarbon mixture; and injecting the proppant and the foamed unfractionated hydrocarbon mixture together into a hydrocarbon bearing reservoir to fracture the hydrocarbon bearing reservoir.

20. The method of claim 19, wherein the proppant and the foamed unfractionated hydrocarbon mixture are injected into the hydrocarbon bearing reservoir at a temperature below 0 degrees Fahrenheit.

* * * * *